J. C. BARTLEY AND J. G. OPHARDT.
ANTIGLARE ATTACHMENT FOR AUTOMOBILES.
APPLICATION FILED JUNE 22, 1920.

1,368,997.

Patented Feb. 22, 1921.

Inventor
J. C. Bartley,
J. G. Ophardt

By

Attorney

UNITED STATES PATENT OFFICE.

JOHN C. BARTLEY, OF ENGLEWOOD, AND JOHN G. OPHARDT, OF PLATTEVILLE, COLORADO.

ANTIGLARE ATTACHMENT FOR AUTOMOBILES.

1,368,997. Specification of Letters Patent. Patented Feb. 22, 1921.

Application filed June 22, 1920. Serial No. 390,945.

*To all whom it may concern:*

Be it known that we, JOHN C. BARTLEY and JOHN G. OPHARDT, citizens of the United States, residing at Englewood, Arapahoe county, Colorado, and Platteville, county of Weld, and State of Colorado, respectively, have invented certain new and useful Improvements in Antiglare Attachments for Automobiles; and we do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide an anti-glare attachment to be mounted on the steering post of an automobile in front of the driver to eliminate glare from lights of approaching machines, which device will be simple, durable, easily operated and cheap to manufacture.

Briefly, the invention comprises a glare-eliminating or reducing member adjustably mounted on a standard which is in turn adjustably mounted on a clamp of such construction that it is adapted for attachment to all types of steering posts. The clamp is a two-piece member, each part of which is provided with an engaging jaw, the parts being pivoted and connected with the standard at the pivot, while a securing bolt extends through the parts adjacent the jaws.

In the drawings forming a part hereof—

Figure 1:
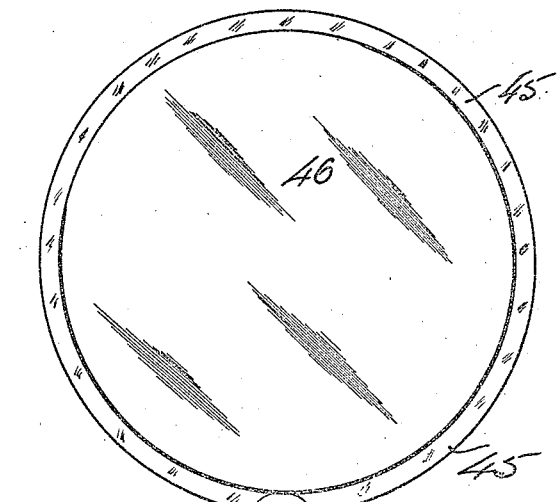
Figure 1 is a face view.
Figure 2:
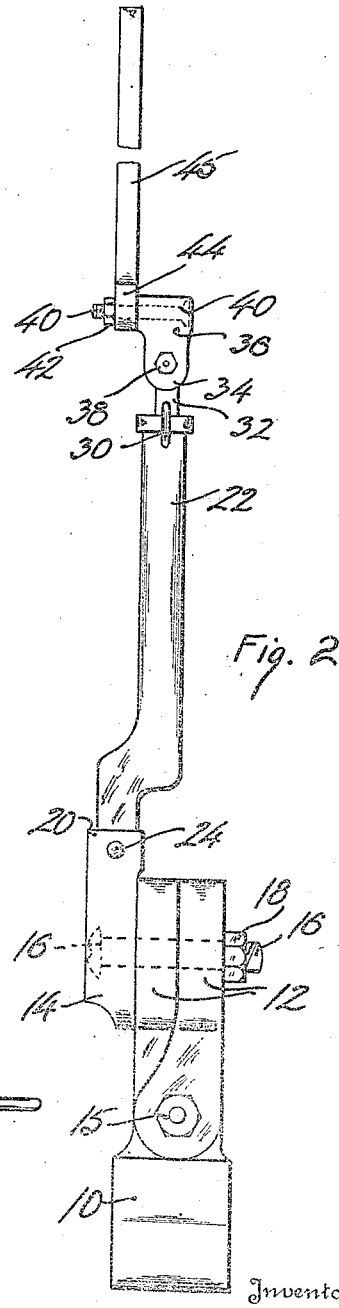
Fig. 2 is an edge view showing the invention.

The clamp for securing the device to a steering post is composed of two jaw members 10 of sufficient width to support the device firmly upon the steering post. Each clamp portion is reduced to form a narrow eye section 12, the sections 12 being arranged side by side to receive a pivoting bolt 16 by means of which they are bound together and retained in pivotal relation with a joint member or friction block 14, a nut 18 being threaded on bolt 16 to retain the parts in operative position. A securing bolt and nut 15 are provided to clamp the jaws 10 in engagement with the steering post, the bolt passing through the jaws and the nut being adapted to fit in a countersunk seat in the adjacent jaw as shown.

The friction block 14 has its upper portion provided with spaced ears 20 which receive between them the reduced lower end of a standard 22. A handle 24 is provided for the double purpose of pivoting the standard 22 on the friction block 14, and swinging the standard and friction block with respect to clamp 10 about pivot 16. This is accomplished by reducing the inner end of handle 24 to form a shoulder at 25 to engage the adjacent ear 20, the reduced end passing freely through said adjacent ear and being threaded through the other ear as indicated at 26, thus binding ears 20 against the end of standard 22 to form a friction joint. A lock-nut 28 is preferably threaded on the projecting portion of said reduced handle end. The upper end of the standard 22 is provided with a thumb screw 30 to bind against a flat face of a stem 32 which projects into a cavity within the standard 22 to retain said stem 32 in adjusted position. The upper end of stem 32 is pivoted between ears 34 of a link 36 by means of a pivoting screw 38 which produces a friction joint. The upper end of link 36 also has a friction joint with an ear 44 on a frame 45 by means of a bolt 40 and nut 42.

The anti-glare medium 46 is carried within the frame 45, and is preferably of a colored non-shatterable glass.

By reason of the pivotal connection at 16 and the securing bolt 15 the clamp 10 may be secured to any size or style of steering post. The pivots at 25 and 38 permit the parts to be adjusted forward or backward in front of the steering wheel as desired. Screw 30 permits adjustment of the length of the article. When driving, handle 24 is grasped to swing standard 22 and the anti-glare member 46 either to the right or left to move them about pivot 16 to either operative or inoperative position. When there is no glare to be cut off the member 46 will be moved to either side of the driver's position so as to be out of his line of vision, the friction joints being tight enough to hold the parts in set position, but such that adjustment may be made easily.

We claim:

An anti-glare attachment for automobiles comprising a clamp adapted to be secured to a steering post, said clamp comprising a pair of jaw members mounted on a pivot, means to secure said members to the post located at a distance from the pivot, a friction block also mounted on said pivot, a standard pivotally mounted on said block, an operating handle connected with said block and standard having an extension passing through said block and standard and constituting the pivot therefor, means to produce a tight friction joint at the last named pivot, and an anti-glare attachment mounted on said standard.

In testimony whereof we affix our signatures.

JOHN C. BARTLEY.
JOHN G. OPHARDT.